United States Patent [19]

Pfleger

[11] Patent Number: 5,038,718
[45] Date of Patent: Aug. 13, 1991

[54] EXPANDABLE BELT

[76] Inventor: Frederick W. Pfleger, 1152 Barbara Dr., Cherry Hill, N.J. 08003

[21] Appl. No.: 530,191

[22] Filed: May 29, 1990

[51] Int. Cl.⁵ .............................................. A01K 27/00
[52] U.S. Cl. .................................... 119/106; 119/156; 2/338
[58] Field of Search ........................ 119/106, 96, 156; 2/338, 311, 337; 24/298, 300, 301; 248/503

[56] References Cited

U.S. PATENT DOCUMENTS 3,063,058 11/1962 Vollet ...................................... 2/338
3,918,407 11/1975 Greenberg ........................ 119/106 X
4,367,572 1/1983 Zielenski ................................ 24/301

Primary Examiner—John G. Weiss
Assistant Examiner—R. Thomas Price

[57] ABSTRACT

A resilient material flea and tick belt wherein the stretching strength of the resilient material of the belt is reduced in a given portion of the belt by providing slits or cut outs in a definite pattern. In the specific application as in animal flea and tick collars, the belt can stretch a distance that will prevent the animal from strangling if it is caught on a foreign object such as a branch of a tree.

11 Claims, 1 Drawing Sheet

EXPANDABLE BELT

BACKGROUND OF INVENTION

While the belt configuration of this invention has been designed, in particular for cat flea and tick collars, it is appreciated that this invention is capable of many varied applications and shapes all of which are intended to be comprehended herein.

Although the flea and tick collars are used on a great many animals successfully, there are many cases in which the animals, particularly cats, get hung on a branch while climbing, resulting in death or injury by strangulation. To correct this condition various attempts have been made, such as, securing low strength elastic material in series with the higher strength belt material. This corrective measure is expensive to manufacture since the added material must be fabricated, cut to size, and secured to the belt by rivets, clips, etc. The present invention overcomes these difficulties while still providing for the desired advantages.

SUMMARY OF THE INVENTION

It is an important object of the present invention to provide an improved belt construction that would help in preventing strangulation of the animals wearing a belt.

It is another object of this invention to provide a belt with the desired feature that can be manufactured utilizing only the resilient belt material and the buckle.

It is another object of this invention to produce a belt with the anti-strangulation feature for a very small additional cost.

It is another object of this invention to provide a belt in which the full length of the belt can be used for repellent storage with the chemicals for repelling of fleas and ticks.

It is another object of this invention to provide a belt that is pleasing to look at.

It is another object of this invention to provide a flea and tick repellent belt whose life is determined by the chemical life of the stored repellent and not by the failure of added parts and attaching means.

Other objects of the present invention will become apparent upon reading the following specifications and referring to the corresponding drawings which form a material part of this disclosure.

The invention accordingly consists in the feature of construction which will be exemplified in the following description and of which the scope will be indicated by the appended claims.

DESCRIPTION OF PREFERRED EMBODIMENT

In flea and tick collars, the collars must be of a given size to hold the chemicals necessary to repel the fleas and ticks. This type of belt, although made of resilient material, has a cross section of such a size that the tensile force to stretch the belt is quite high. If this type of belt is worn by a cat or other small animal, and the cat or animal gets accidentally hung up on branches of trees while climbing, the belt will not yield or stretch under the weight or strength of the cat or animal. As a result of the belts not yielding sufficiently, the cat or animal can strangle or otherwise hurt itself. In this invention the design of the belt to provide the correct yielding of the belt contains specific slits and or slots. The configurations of the slits and or slots are therefore made to reduce the force needed to stretch the belt while still retaining the maximum volume of belt material for the repellent storage.

The following will describe the use of slits although the use of small slots would provide the same results.

Figure 1:
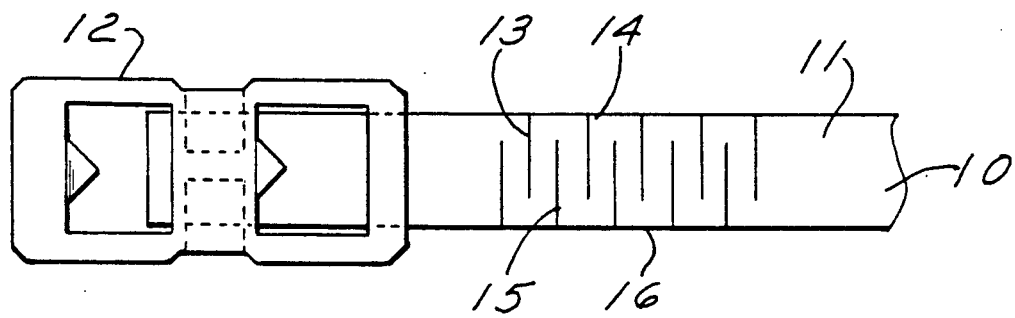
FIG. 1 is a view of one version of the belt in relaxed normal position.
Figure 2:
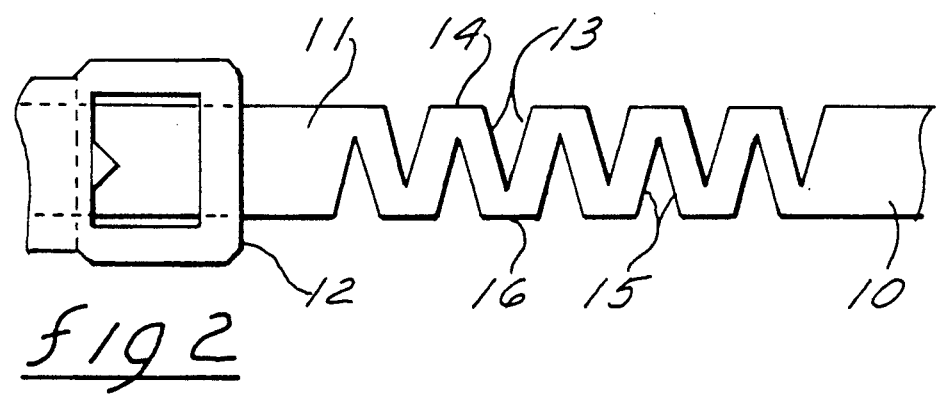
FIG. 2 is a view of the same belt as FIG. 1 in the stretched position.

Referring to FIG. 1 of the drawings, a belt 10 comprises a length of resilient material 11 in which the free end of the belt can be fastened to a holding or securing buckle 12 making it a closed loop belt around the wearer. In this particular application relatively close to buckle 12 is a zone of the belt material that is provided with slits 13 cut from a first portion 14 on a first side of the belt inwardly towards and past the centerline of the belt. From the opposite edge portion 16 on a second side of the belt are a second series of slits 15, extending from the edge 16 inwardly towards and past the centerline towards the edge 14. The slits for optimum conditions are spaced a definite distance apart. In this design the distance apart is the same as the distance from the end of the slots 13-15 to the belt edges 16-14 respectively. This arrangement makes the appearance of the belt pleasing and symmetrical as shown in FIG. 2. The belt moves from the closed condition shown in FIG. 1 to the extended position of FIG. 2 by tension applied anywhere along the belt length. In moving to the condition of FIG. 2 a tensile force is produced in the resilient material at the end of the slit and a compressive force is produced in the material at the outer edge of the belt adjacent to the end of the slits. This tensile and compressive force in the belt material will return the belt to normal condition when the tension applied to the belt is removed.

Figure 3:
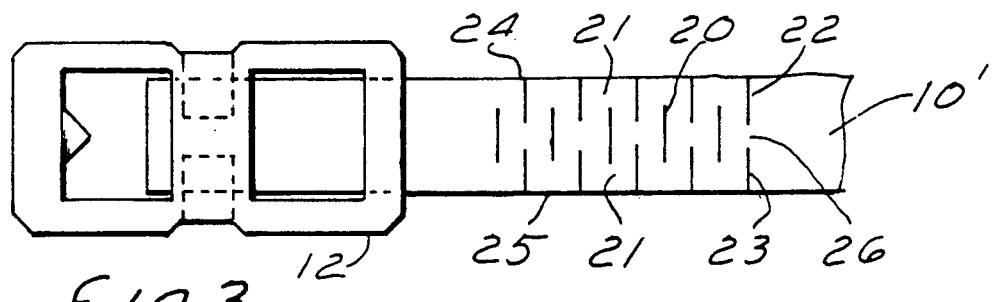
FIG. 3 is a view of another version of the belt in relaxed position.

An alternative design of the slits is shown in FIG. 3. In this configuration a slit 20 is made to extend crosswise the belt 10'. The slit 20 starts and stops a distance 21 from the edges 24 and 25. A pair of slits 22 and 23 are positioned away from slits 20 a distance approximately equal to the distance 21. These configurations are selected for simplicity and aesthetics. It is obvious that any of the distances can be varied for design requirements such as added strength, quicker return to normal, etc.

Figure 4:
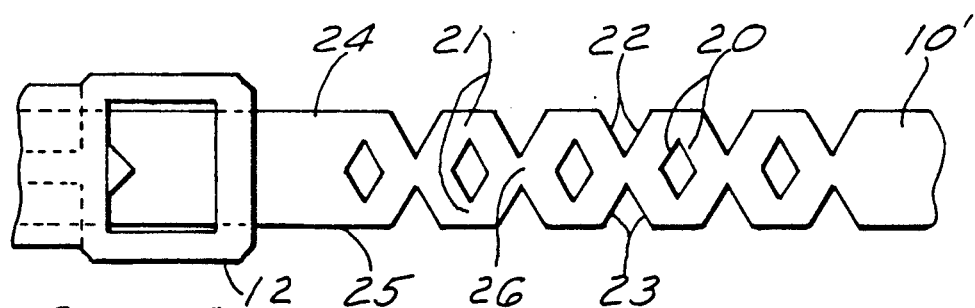
FIG. 4 is a view of the belt of FIG. 3 in the stretched position.

When tensile forces are applied to the belt 10' in FIG. 3, the slits shown in FIG. 3 will expand to a configuration shown in FIG. 4. As described in reference to FIG. 2, compressive and tensile forces are generated in the resilient material at the ends of the slits. As a result these forces in the resilient material of the belt located at 21 and 26 at the ends of the slits returns the belt to normal when the tension is removed from the belt.

Since the amount of lengthening and the tension to lengthen required from the belt may vary with the size of the user, the amount of lengthening of the belt and the force necessary to lengthen the belt can be varied by increasing or decreasing the number of slits and the length of the slits.

From the foregoing, it is seen that there is provided a highly advantageous belt construction that contains the needed material volume for storage of the repellent material, the needed appearance, and the needed structural rigidity. The belt is able under accidental tensioning to stretch or elongate; therefore not harming the wearer.

Although the present invention has been described in some detail by way of illustration and example for purposes of clarity and understanding, it is understood that certain changes and modifications may be made within the spirit of the invention.

What is claimed is:

1. An integral resilient material belt having a given length, width, thickness and a predetermined tensile strength, a first end and a second buckle end securable to said first end of said belt, comprising: a plurality of slits cut into said belt in a direction substantially across said width, through said thickness, and positioned along the length of said belt, said plurality of slits separate from each other enabling the elongation of said belt at a tensile strength lower than said predetermined tensile strength.

2. A belt of resilient material according to claim 1 wherein said plurality of slits are in specific patterns.

3. An integral resilient material belt according to claim 1 wherein reduction of said lower tensile strength reduces the separation of said plurality of slits by the resiliency of said resilient material.

4. An integral resilient material belt according to claim 1 wherein said elongation of said belt enables an animal to slip through and from said belt as a safety measure if said belt is caught.

5. An integral resilient material belt according to claim 1 wherein said resilient material is impregnated with a chemical material.

6. An integral resilient material belt according to claim 1 including a width extending between a first and a second edge wherein each of said plurality of slits successively alternate beginning from said first edge and said second edge.

7. An integral resilient material belt according to claim 1 wherein said width extending between a first and a second edge, said plurality of slits successively alternate about said length of said belt including a first slit extending within said first and said second edges and a second colinear slit that begins from both said first and said second edges.

8. An integral resilient material belt having a given length, width, thickness, and a predetermined elongating strength; a first end and a second end, a buckle secured to said first end, said second end adaptable to be secured by said buckle, comprising: a plurality of slits cut through said thickness of said belt in a direction substantially across said width of said belt and positioned along the length of said belt, said plurality of slits forming a plurality of openings formed from said slits, said opening openable at a lower elongating strength than said predetermining elongating strength enabling elongation to said belt.

9. An integral resilient material belt according to claim 8 wherein said elongation to said belt from said plurality of openings returns to said given length when said lower elongation strength is removed.

10. An integral resilient material belt according to claim 8 including a width extending between a first and a second edge wherein each of said plurality of slits successively alternate beginning from said first edge and second edge.

11. An integral resilient material belt according to claim 8 wherein said width extending between a first and a second edge, said plurality of slits successively alternate about said length of said belt including a first slit extending within said first and said second edges and a second colinear slit that begins from both said first and said second edges.

* * * * *